(12) United States Patent
Yager

(10) Patent No.: US 10,612,433 B2
(45) Date of Patent: Apr. 7, 2020

(54) CAMLESS ENGINE DESIGN

(71) Applicant: James Henry Yager, Northville, MI (US)

(72) Inventor: James Henry Yager, Northville, MI (US)

(*) Notice: Subject to any disclaimer, the term of this patent is extended or adjusted under 35 U.S.C. 154(b) by 102 days.

(21) Appl. No.: 15/916,991

(22) Filed: Mar. 9, 2018

(65) Prior Publication Data
US 2018/0363516 A1  Dec. 20, 2018

Related U.S. Application Data

(60) Provisional application No. 62/469,123, filed on Mar. 9, 2017.

(51) Int. Cl.
*F01L 9/02* (2006.01)
*F02D 13/02* (2006.01)
*F01L 25/02* (2006.01)

(52) U.S. Cl.
CPC ............ *F01L 9/02* (2013.01); *F01L 9/021* (2013.01); *F01L 9/025* (2013.01); *F01L 25/02* (2013.01); *F02D 13/0207* (2013.01); *F02D 13/0253* (2013.01)

(58) Field of Classification Search
CPC ... F01L 9/02; F01L 9/021; F01L 9/025; F01L 25/02; F02D 13/0253; F02D 13/0207
See application file for complete search history.

(56) References Cited

U.S. PATENT DOCUMENTS 6,026,771 A * 2/2000 Escobosa .................. F01L 9/02
123/90.11

* cited by examiner

*Primary Examiner* — Zelalem Eshete
(74) *Attorney, Agent, or Firm* — Mitchell Law PLLC; Matthew W. Mitchell

(57) ABSTRACT

A camless valve control system for an internal combustion engine, includes a hydraulic pump, with a rotating shaft timed to the operation of the engine and a hydraulic actuator configured to selectively open and close one of an intake valve and an exhaust valve of the engine. The hydraulic actuator includes a rotating cylindrical pump body and one or more control rings with holes channeling the flow of the hydraulic control fluid to affect the selective opening and closing of the one of the intake value and the exhaust valve. The pump body includes a cylindrical center portion configured to receive torque from the hydraulic pump and at least one channel providing a flow of hydraulic control fluid from the pump.

4 Claims, 17 Drawing Sheets

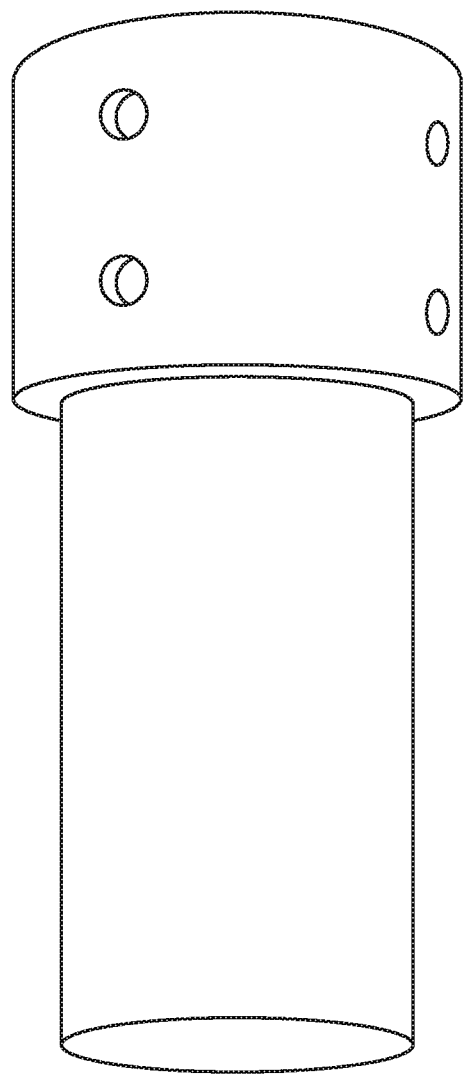

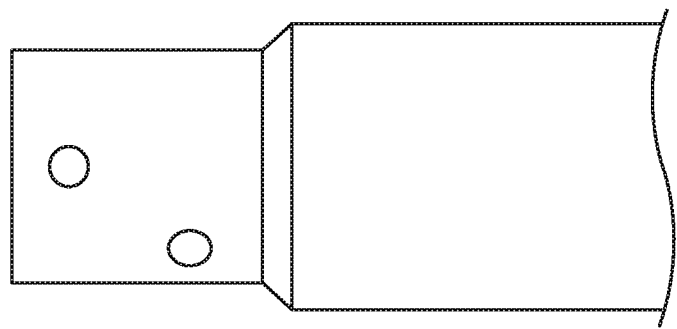
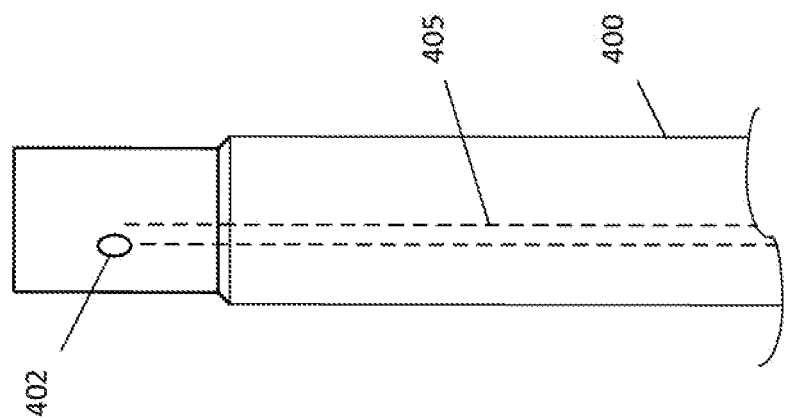
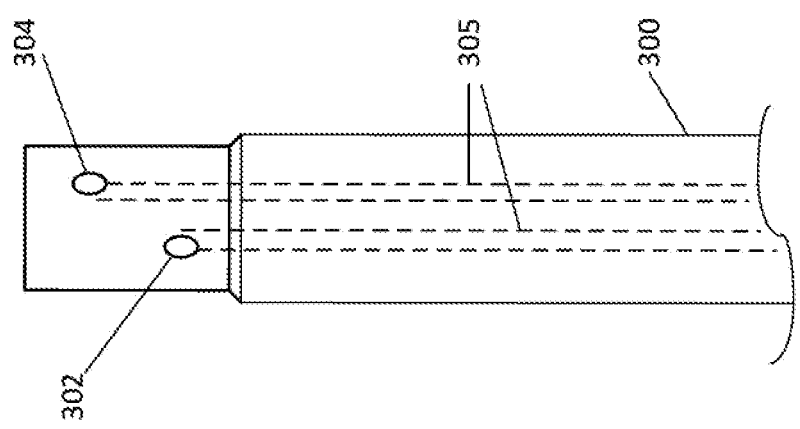
FIG. 2C
FIG. 2B
FIG. 2A

CAMLESS ENGINE DESIGN

CROSS-REFERENCE TO RELATED APPLICATIONS

This disclosure claims the benefit of U.S. Provisional Application No. 62/469,123 filed on Mar. 9, 2017, which is hereby incorporated by reference.

TECHNICAL FIELD

This disclosure is related to internal combustion engine control, particularly to a camless system for controlling intake and exhaust valve actuation.

BACKGROUND

The statements in this section merely provide background information related to the present disclosure. Accordingly, such statements are not intended to constitute an admission of prior art.

Internal combustion engines include one or more intake valves controlling intake flow into a combustion chamber and one or more exhaust valves controlling exhaust flow from the combustion chamber. Valve control includes opening and closing the valves as various times during a combustion cycle. One known method to control valves includes a timed rotating camshaft, which by rotation of at least one non-circular cam displaces the valves from a closed condition to accomplish the desired opening and closing of the valves.

Almost all modern automotive engines have gone to flexible valvetrains for performance, fuel economy, and emissions reasons. Valve control in both magnitude, timing, and duration can greatly impact operation of the engine. A camshaft is only one method for controlling valve operation. Camshafts are somewhat limited in how much variation or flexibility a spinning cam can afford the valve operation. Camless systems provide flexibility, removing the limitations of the spinning cam from available valve control options.

Almost all engine manufactures would like the flexibility of camless valve control but avoid it for the following reasons plaguing all currently available systems: system cost, reliability and durability, package size, and parasitic losses.

SUMMARY

A camless valve control system for an internal combustion engine, includes a hydraulic pump, with a rotating shaft timed to the operation of the engine and a hydraulic actuator configured to selectively open and close one of an intake valve and an exhaust valve of the engine. The hydraulic actuator includes a rotating cylindrical pump body and one or more control rings with holes channeling the flow of the hydraulic control fluid to affect the selective opening and closing of the one of the intake value and the exhaust valve. The pump body includes a cylindrical center portion configured to receive torque from the hydraulic pump and at least one channel providing a flow of hydraulic control fluid from the pump.

BRIEF DESCRIPTION OF THE DRAWINGS

One or more embodiments will now be described, by way of example, with reference to the accompanying drawings, in which:

FIG. 1B illustrates through a photograph an exemplary embodiment of the actuator of FIG. 1A, in accordance with the present disclosure.

FIG. 2A illustrates an exemplary pump body of the hydraulic actuator of FIG. 1, in accordance with the present disclosure.

FIG. 2B illustrates an exemplary alternative to the pump body of FIG. 2A, in accordance with the present disclosure.

FIG. 2C illustrates through a photograph an exemplary embodiment of the actuator of FIG. 2A, in accordance with the present disclosure.

DETAILED DESCRIPTION

Figure 1A:
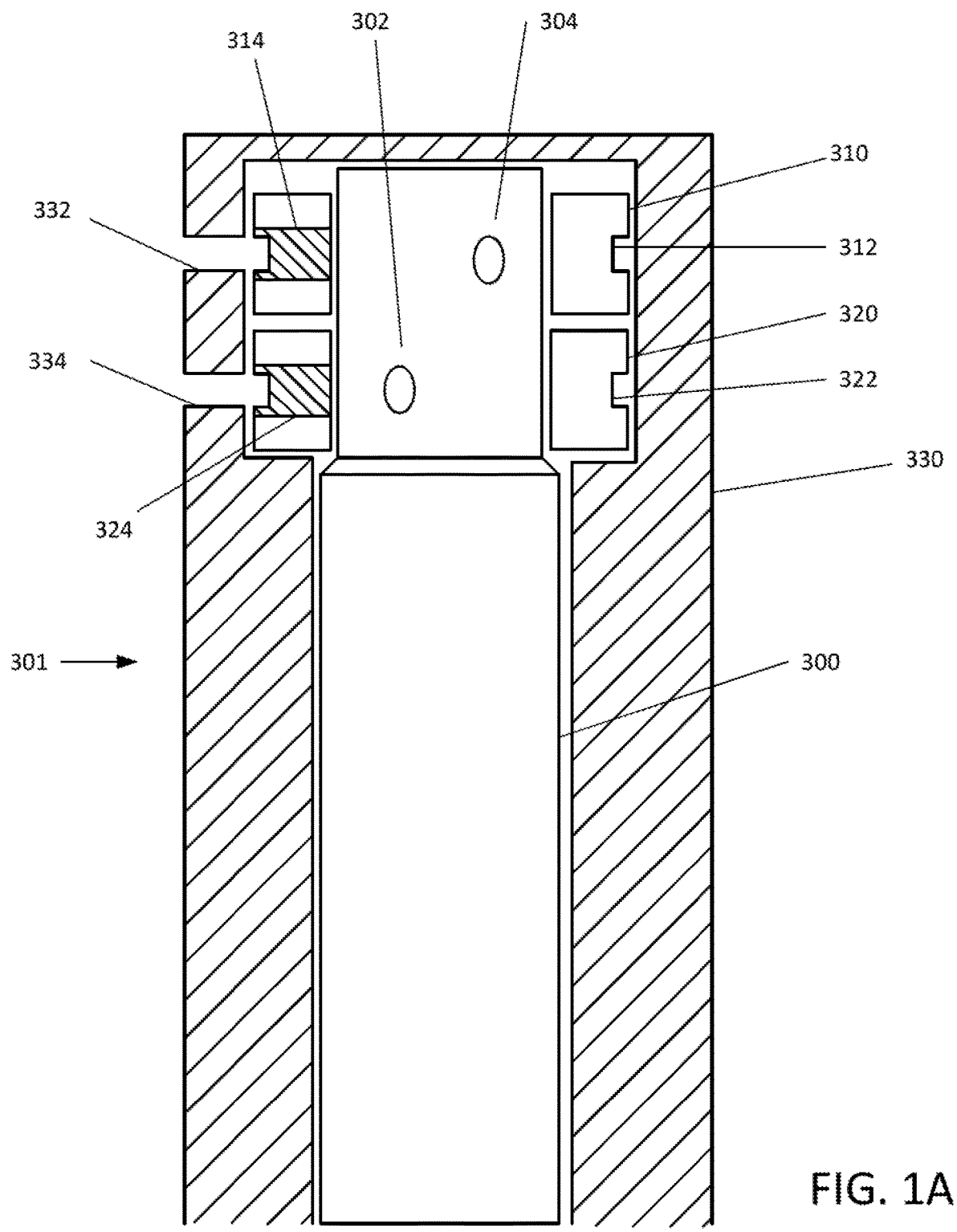
FIG. 1A illustrates an exemplary hydraulic actuator useful to control engine intake and exhaust valves, in accordance with the present disclosure.

A camless valve control system is disclosed. In one embodiment, the camless valve control system utilizes hydraulic control to actuate intake and exhaust cylinder valves. As compared to systems utilizing overhead cams or pusher rods, the disclosed system provides for flexibility and efficiency. The disclosed camless valve control system is a robust cost effective system in a package size which is compact and provides the opportunity to reduce engine height and length The system in one embodiment is electro-hydraulic and uses hydraulics for the motive force. Most of the hydraulic energy is recovered with an energy recovery system, providing control with low parasitic losses.

The camless valve control system can utilize a distributor system to control all valves with the minimum number of control actuators. In one more complex variation, four control actuators are used to create a completely flexible system. The system can employs limits on control rings within the distributor system which prevent any chance of valve to piston contact.

All control resides in a single unit capable of driving up to all valves on up to a 12 cylinder engine. The valves are driven with a positive displacement hydraulic system which controls the lift removing the need for valve position sensors. The system uses valve actuators or simple two stage hydraulic cylinders which control opening and seating velocities and eliminate the need for lash adjusters. Two stage hydraulics provide the ability to open against high cylinder pressures while minimizing hydraulic oil pressure and flow requirements.

Cylinder deactivation can easily be added by with the addition of electronically controlled bleed valves on all cylinders that require deactivation.

In one embodiment, the control system utilizes a hydraulic pump. The pump can be either a fixed displacement or a variable displacement swash plate hydraulic pump. In one example, the pump can be driven at one half engine speed. The pump must be timed to the engine. The pump will serve as a distributor of the hydraulic fluid to all of the engine valves both intake and exhaust valves with one pump being capable of driving up to all valves on a 12 cylinder engine.

Additional cylinders or an extremely long opening or closing ramp may require additional pumps with each pump operating a subset of the engine valves. With multiple pumps any number of cylinders is possible.

The pump/pumps can have radial ports spaced evenly around the circumference of the pump housing with each port being connected to a supply and a drain control ring. The control rings can be inside of the pump housing and will be capable of rotating through an angle of approximately 90 degrees to provide variation in the engine valve opening and closing positions.

All hydraulic sealing is accomplished with small clearances between the diameters of the pump distributor, the control rings, and the pump housing which will control the leakage.

The control rings will have a series of circumferential grooves, separated by a short distance, communicating with the ports on the outside of the pump. With high cylinder counts that require a large amount of timing variation a single grove may be replaced with two or more parallel grooves on the same control ring with the some of the ports being axially staggered to align with the additional groove/grooves. With this configuration there will need to be multiple supply and drain ports to align with the additional grooves. The grooves will always be in communication with the port that it is supplying hydraulic oil to or draining hydraulic oil from. Each of the grooves will have a single radial hole that communicates with the supply or drain port/ports on the pump. The ports to the engine valve actuators will be closed during valve dwell open or closed In one embodiment, the pump body will rotate inside the control rings at ½ engine speed and will serve as a distributor to control which port is receiving or draining the hydraulic oil. In another embodiment, the control rings will rotate at ½ engine speed and will serve as a distributor to control which port is receiving or draining the hydraulic oil.

All intake and all exhaust ports will remain in phase with each other. As an example a four cylinder engine with two valves per cylinder will have a total of eight ports, four intake and four exhaust, spaced at 90 degrees apart. The supply lines to the valve actuators will be connected in the firing order of the engine around the pump. The distributor will work similarly to an old fashion spark distributor with one ignition source providing power to all of the spark plugs.

The variation of the opening and closing of the valves will be controlled by the four control rings in the pump which will change the angular position of the opening of the supply and drain ports. During valve closing the closing port will be in communication with the appropriate valve and returning oil to the inlet side of the hydraulic pump.

The pump/pumps will have in essence two pumps with one portion driving the exhaust valves and the other driving the intake valves. The use of two pumps is possible with a single cylinder and swash plate by angling the outlets to a smaller or larger radius on every other piston and by having them communicate with two sets of kidney slots one driving the inlet valves and the other driving the exhaust valves.

The inlet of the pump, like the outlet, will be positive displacement and due to this fact the return rate will be proportional to engine speed which will cause the valves to close in a given number of crank degrees determined by the pump layout. With a variable swash plate angle this rate can be changed.

The oil being returned to the pump will be pressurized by the energy in the valve spring and will be returning energy back to the pump therefore reducing the parasitic losses.

In one embodiment, the oil used by the pump to actuate the cylinder valve positions will be a separate loop of hydraulic oil. In another embodiment, the oil used by the pump to control the cylinder valves will be the engine oil utilized to lubricate the engine. In such an embodiment, the pump will be supplied with both return oil from the hydraulic control circuits and low pressure oil from the engine. This oil will keep the inlet side of the pump filled and it can be supplied with a check valve to prevent it from flowing out of the pump during valve closing when higher pressure oil is being returned to the pump.

Limits on the control ring travel will make porting positions that would result in valve to piston contact impossible.

Figure 7:
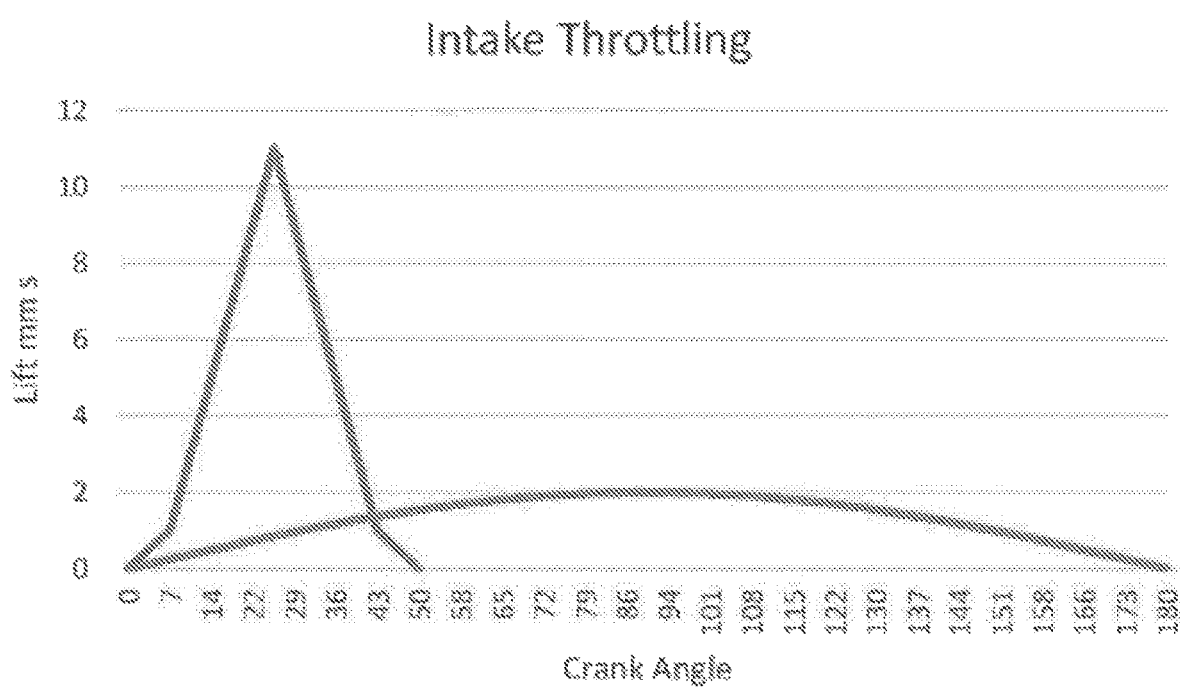
FIG. 7 graphically illustrates improved control of an exemplary intake valve during an intake throttling event, enabling the system to incur minimized pumping losses as compared to a known camshaft controlled system, in accordance with the present disclosure.

By disconnecting cylinder valve control from rotation of a cam which is typically connected via a timing chain to the engine, various control methods can be utilized to achieve unconventional results in engine control. In one example, it is possible to have the closing ports open for a portion of the valve opening event to reduce the opening height and to shorten the valve duration when desired for intake throttling or possibly in some braking situations. FIG. 7 graphically illustrates improved control of an exemplary intake valve during an intake throttling event, enabling the system to incur minimized pumping losses as compared to a known camshaft controlled system.

During valve opening the opening port will be in communication with the appropriate valve and supplying oil from the high pressure side of the hydraulic pump. The pump/pumps will have in essence two pumps with one portion driving the exhaust valves and the other driving the intake valves. The outlet of the pump, like the inlet, will be positive displacement and due to this fact the opening rate will be proportional to engine speed which will cause the valves to open in a given number of crank degrees determined by the pump layout. With a variable swash plate angle this rate and valve lift can be changed.

The pump will be supplying oil to the two stage valve actuators and will only supply the pressure required to move the engine valves against the spring force and the pressure differential across the valve head. The opening control rings will have vents built into them that will allow the supply pressure to drop to a very low level when not supplying oil to open the valves, i.e. low parasitic driving power.

Limits on the control ring travel will make porting positions that would result in valve to piston contact impossible.

FIG. 1A illustrates an exemplary hydraulic actuator useful to control engine intake and exhaust valves, in accordance with the present disclosure. Hydraulic actuator 301 is illustrated including rotating cylindrical pump body 300, supply control ring 320, return control ring 310, and actuator body 330. Pump body 300 is attached to the hydraulic pump device, and in particular, receives mechanical torque from the pump device in order to precisely turn pump body 300 with the turning of the pump device, which in turn is precisely turned with the vehicle engine through a timing chain device known in the art. The pump body can be described to include a central a cylindrical center portion configured to receive torque from the hydraulic pump and at least one channel providing a flow of hydraulic control fluid from the pump In accordance with an exemplary 4-stroke engine, which completes a combustion cycle in two revolutions of the crank shaft of the engine, the pump bodies of the disclosed system can be connected to the engine in order to turn once for every two turns of the engine crank shaft. In this way, one revolution of the pump bodies can control one combustion cycle and the corresponding valve open and close events in direct timing with the engine.

Pump body 300 includes internal passages which connect hole 302 with a supply of pressurized hydraulic oil from the connected pump device and which connect hole 304 with an oil return sump, making oil returning from the controlled valve available to the pump to be used again in the system.

Supply control ring 320 and return control ring 310 can be static, meaning that they do not turn while the pump body 300 rotates. Such static control rings can be positioned and configured once for an optimal performance setting. In another embodiment, one or both of control rings 320 and 310 can be turned some small amount, for example, up to 90 degrees, with the different locations of the vent holes and other geometry of the control rings changing timing of the intake and exhaust valves for the engine. Such small movement of the control rings can be controlled, for example, by electrical servo motors or electric actuators controlled by an engine control module, for example, a computerized engine controller monitoring torque demands and engine conditions to apply pre-programmed calibrated engine control schemes. The unique and individual control of the intake and exhaust valves enabled by the disclosed system enables control schemes unknown to date.

Supply control ring 320 includes a communication groove 322 traveling around some portion of the circumference of control ring 320 and includes at least one vent hole 324. Rotational alignment of hole 302 with hole 324 determines an opening of the attached engine valve. Return control ring 310 includes a communication groove 312 traveling around some portion of the circumference of control ring 310 and includes at least one vent hole 314. Rotational alignment of hole 304 with hole 314 determines an opening of the attached engine valve.

Actuator housing 330 encloses the control rings and pump body 300 and includes 334 and 332 connected to supply and return hydraulic lines, respectively.

The exemplary actuator has two control rings, one supply and one return, so it would only be capable of controlling either intake or exhaust valves. Another embodiment of a pump according to the disclosure could have double the control rings a set for intake valves and a set for exhaust valves. The aluminum part in this model, the pump cylinder/distributor portion of FIG. 2A, could be the cylinder of the swash plate pump. If not it would need to be rotating with the pump to control timing. In one embodiment it could be incorporated into the cylinder of the swash plate to reduce cost and package size.

FIG. 1B illustrates through a photograph an exemplary embodiment of the actuator of FIG. 1A, in accordance with the present disclosure. Supply and return control rings can be separate to permit adjustment of valve opening and closing events separately. The embodiment of FIG. 1B illustrates connected supply and return control rings as a single unit, enabling simplified control of the timings. In one embodiment, the illustrated control ring can be adjustable as a unit. In another embodiment, the illustrate control ring can be fixed, for example with a notch or notches mating with a corresponding tab on the mating housing, to set the timings of the hydraulic actuator permanently.

FIG. 2A illustrates an exemplary pump body of the hydraulic actuator of FIG. 1, in accordance with the present disclosure. Pump body 300 is illustrated including supply hole 302, return hole 304, and attached internal passages 305 permitting oil to be conducted through pump body 300.

FIG. 2B illustrates an exemplary alternative to the pump body of FIG. 2A, in accordance with the present disclosure. Pump body 400 is illustrated including a single hole 402 and a single internal passage 405.

FIG. 2C illustrates through a photograph an exemplary embodiment of the actuator of FIG. 2A, in accordance with the present disclosure.

Figure 3A:
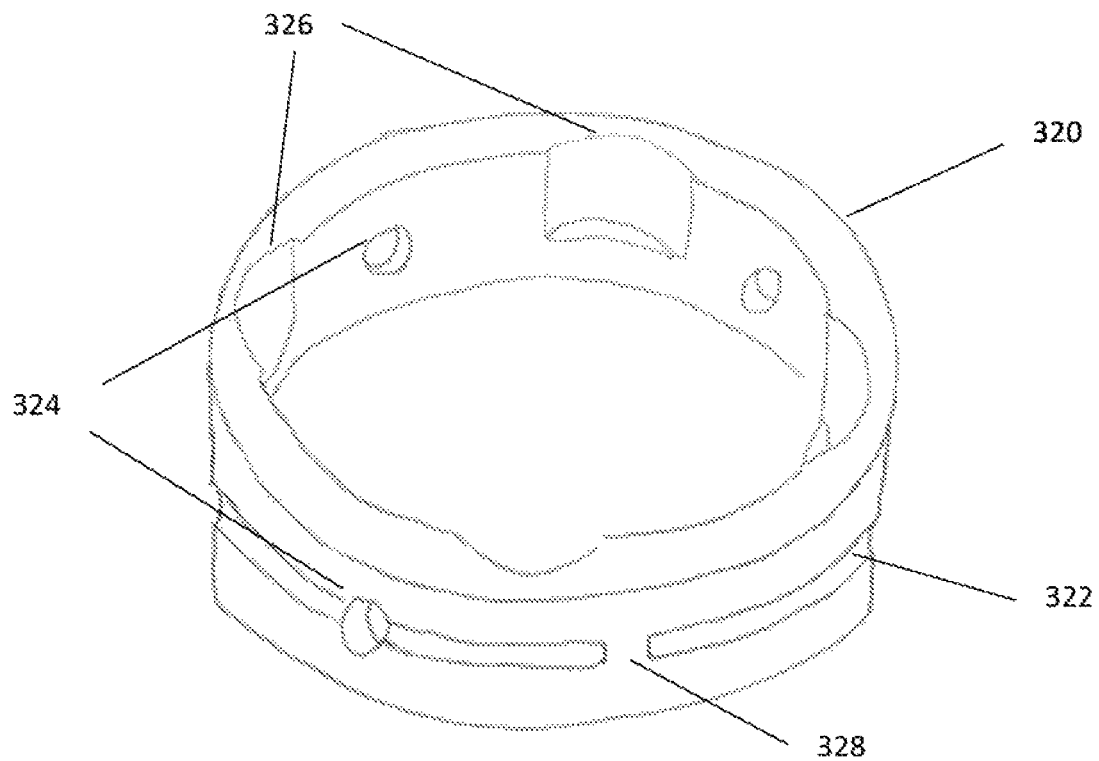
FIG. 3A illustrates an exemplary supply control ring portion of the hydraulic actuator of FIG. 1, in accordance with the present disclosure.

FIG. 3A illustrates an exemplary supply control ring portion of the hydraulic actuator of FIG. 1, in accordance with the present disclosure. Supply control ring 320 includes a communication groove 322 traveling around some portion of the circumference of control ring 320 and includes at least one vent hole 324. Rotational alignment of hole 302 with hole 324 determines an opening of the attached engine valve. Optional bleed scallops 326 are illustrated enabling rapid changing of oil pressure within the control ring. Groove 322 is not continuous, and includes groove breaks 328. Groove breaks 328 are spaces with an surface even with the rest of the widest radius of the control ring preventing oil flow from one groove 322 to a next groove 322. According to one embodiment, four groove breaks at approximately 90 degrees from each other are utilized. If additional angular capability is required the number of segments would need to be reduced to 3 or less and additional rows would need to be added to accommodate greater cylinder counts.

Figure 3B:
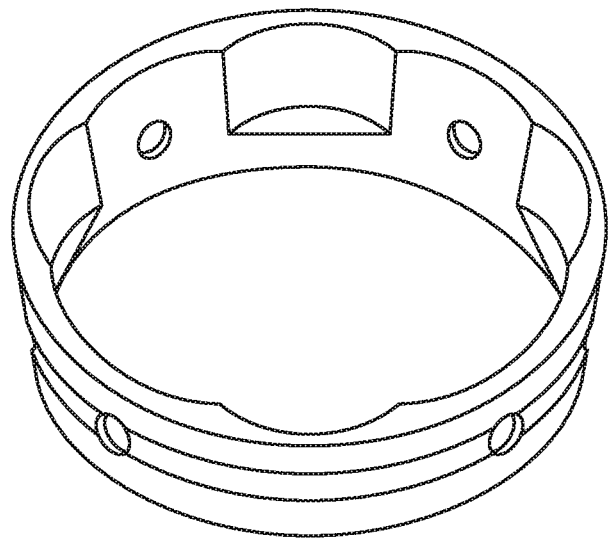
FIG. 3B illustrates through a photograph an exemplary embodiment of the supply control ring of FIG. 3A, in accordance with the present disclosure.

FIG. 3B illustrates through a photograph an exemplary embodiment of the supply control ring of FIG. 3A, in accordance with the present disclosure.

Figure 4A:
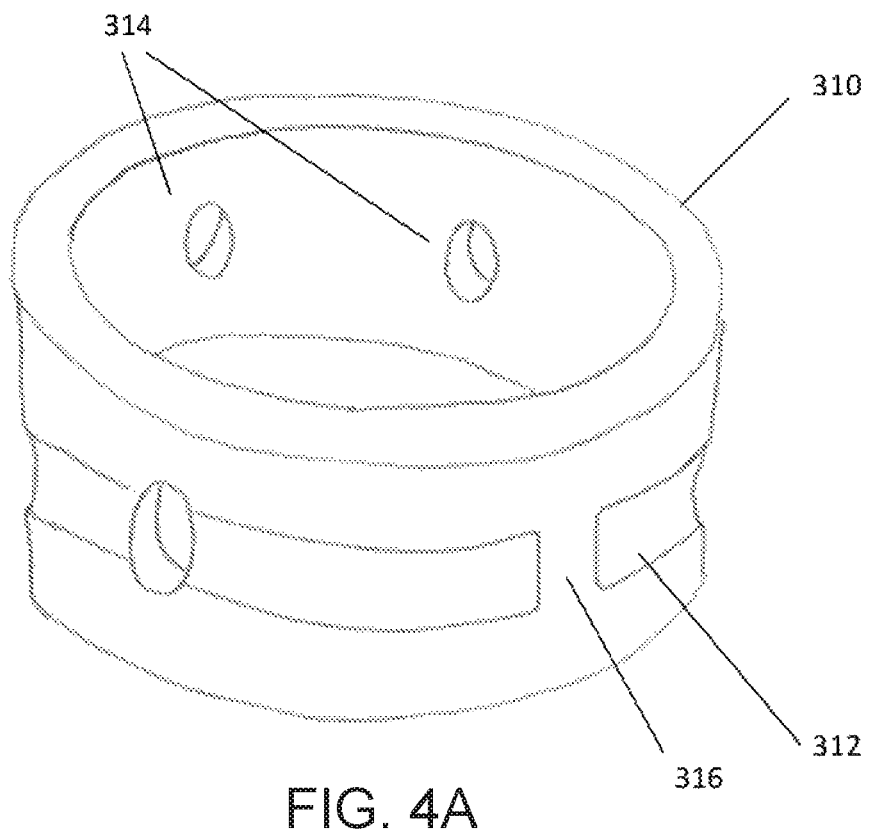
FIG. 4A illustrates an exemplary return control ring portion of the hydraulic actuator of FIG. 1, in accordance with the present disclosure.

FIG. 4A illustrates an exemplary return control ring portion of the hydraulic actuator of FIG. 1, in accordance with the present disclosure. Return control ring 310 includes a communication groove 312 traveling around some portion of the circumference of control ring 310 and includes at least one vent hole 314. Rotational alignment of hole 304 with hole 314 determines an opening of the attached engine valve. Groove 312 is not continuous, and includes groove breaks 316. Groove breaks 316 are spaces with an surface even with the rest of the widest radius of the control ring preventing oil flow from one groove 312 to a next groove 312. According to one embodiment, four groove breaks at approximately 90 degrees from each other are utilized.

Figure 4B:
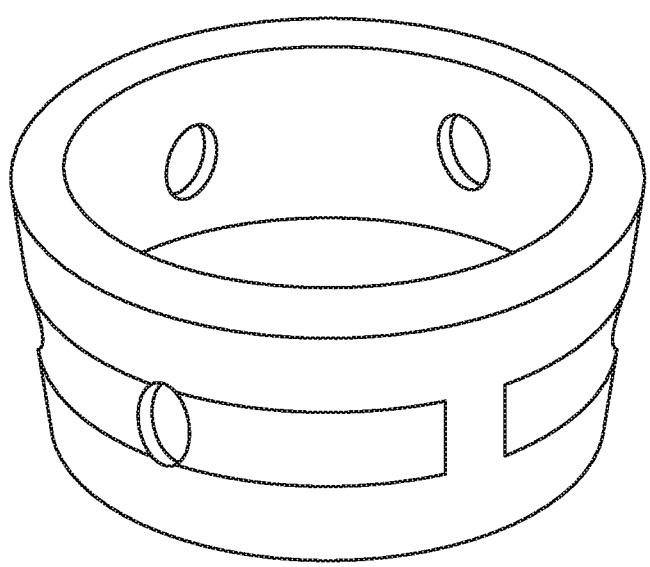
FIG. 4B illustrates through a photograph an exemplary embodiment of the supply control ring of FIG. 4A, in accordance with the present disclosure.

FIG. 4B illustrates through a photograph an exemplary embodiment of the supply control ring of FIG. 4A, in accordance with the present disclosure.

The grooves in the control rings have the oil holes in the center of the groove but the actual position would be determined by the desired valve opening and closing range. The radial drillings in the aluminum part would provide the oil supply and drainage with one being hydraulically connected to the supply side of the pump and one to the return side of the pump. Adjacent holes in the housing would be connected by a T piece and would communicate through a single hydraulic line for each intake or exhaust valve.

Each valve would have a hydraulic actuator. In one exemplary configuration, the actuators would be two stage. In other embodiments, the actuators can include three or more stages. The large piston portion can be approximately 5 times the size of the smaller one to provide the high force required for opening and to reduce the closing velocity when the valve is close to the seat. The large piston portion can be a very small portion of the total stroke. The hydraulic actuators can also incorporate valve lash adjustment.

Hydraulic actuators may also include a vent port with or without a hard stop to limit the maximum valve opening. Hydraulic actuators can be used to remove any valve to valve opening variation, can be used to damp valve motion, and can be used in conjunction with a variable displacement pump to vary opening and closing rates without changing the maximum valve lift. Hydraulic actuators can provides a full range of air flow needs from idle to maximum power for a gasoline engine, including complete lift and duration flexibility on intake and exhaust. Hydraulic actuators eliminate the need for an intake throttle, provide fast valve closing to minimize pumping losses, provide low parasitic loads at all operating conditions, and provide high rpm capability (higher than equivalent cam system.) The disclosed camless system can incorporate cylinder deactivation in a gasoline engine if desired.

Hydraulic actuators of the disclosed camless system can provide full range of air flow needs for a diesel engine. Hydraulic actuators can provide optimized air flow for cold starts, full range of Miller timing with fast closing to minimize pumping losses with aggressive Miller timing, an ability to immediately switch from Miller timing to maximized performance mode. Hydraulic actuators can provide low parasitic losses at all operating modes and can incorporate cylinder deactivation in a diesel engine if desired.

This system offers all desired flexibility with a robust system. This system will provide a fuel economy advantage over variable valve trains (approximately 5 to 12% depending on the system replaced). System simplicity reduces cost and makes it cost competitive with production variable valve train systems. System parasitic power is on parity with conventional valvetrains. Weight can be comparable to conventional valvetrains. Valve cover will be a quiet area which will help reduce oil consumption. Cylinder head design is simplified. This System is fully scalable from engine sizes of less than 1 to 200 plus liters. This system can provide engine braking without the noise level of a Jacobs brake.

Figure 5:
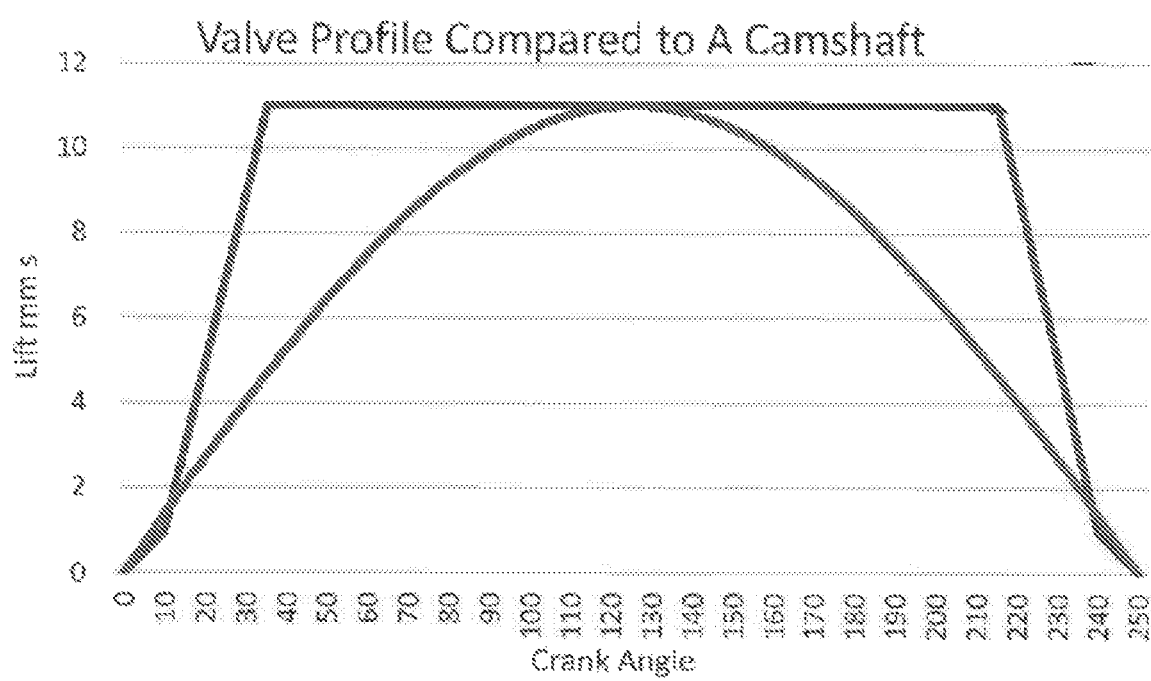
FIG. 5 graphically illustrates exemplary flow area realized with a camless valve control system as compared to a known camshaft valve control system, in accordance with the present disclosure.

FIG. 5 graphically illustrates exemplary flow area realized with a camless valve control system as compared to a known camshaft valve control system, in accordance with the present disclosure. The red arrow illustrates the profile associated with the disclosed system.

Figure 6:
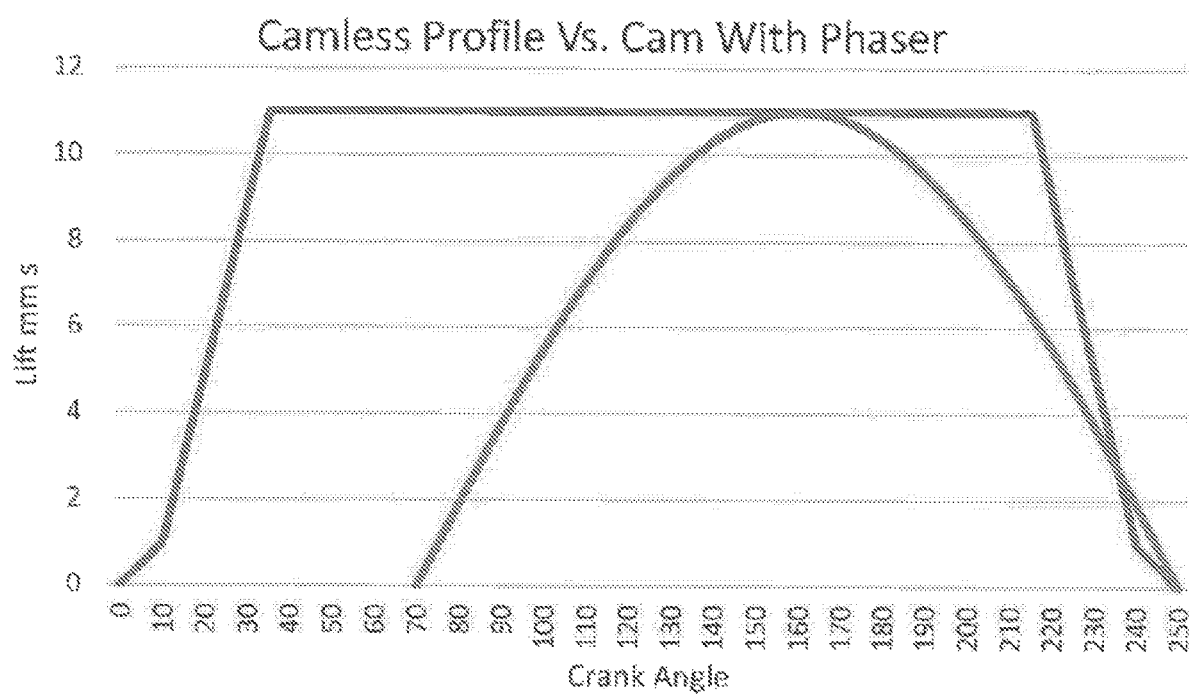
FIG. 6 graphically illustrates valve lift as a function of crank angle for an exemplary camless valve control system as compared to a known camshaft valve control system, in accordance with the present disclosure.

FIG. 6 graphically illustrates valve lift as a function of crank angle for an exemplary camless valve control system as compared to a known camshaft valve control system, in accordance with the present disclosure. The red arrow illustrates the profile associated with the disclosed system.

FIG. 7 graphically illustrates improved control of an exemplary intake valve during an intake throttling event, enabling the system to incur minimized pumping losses as compared to a known camshaft controlled system, in accordance with the present disclosure. The red arrow illustrates the profile associated with the disclosed system.

Figure 8:
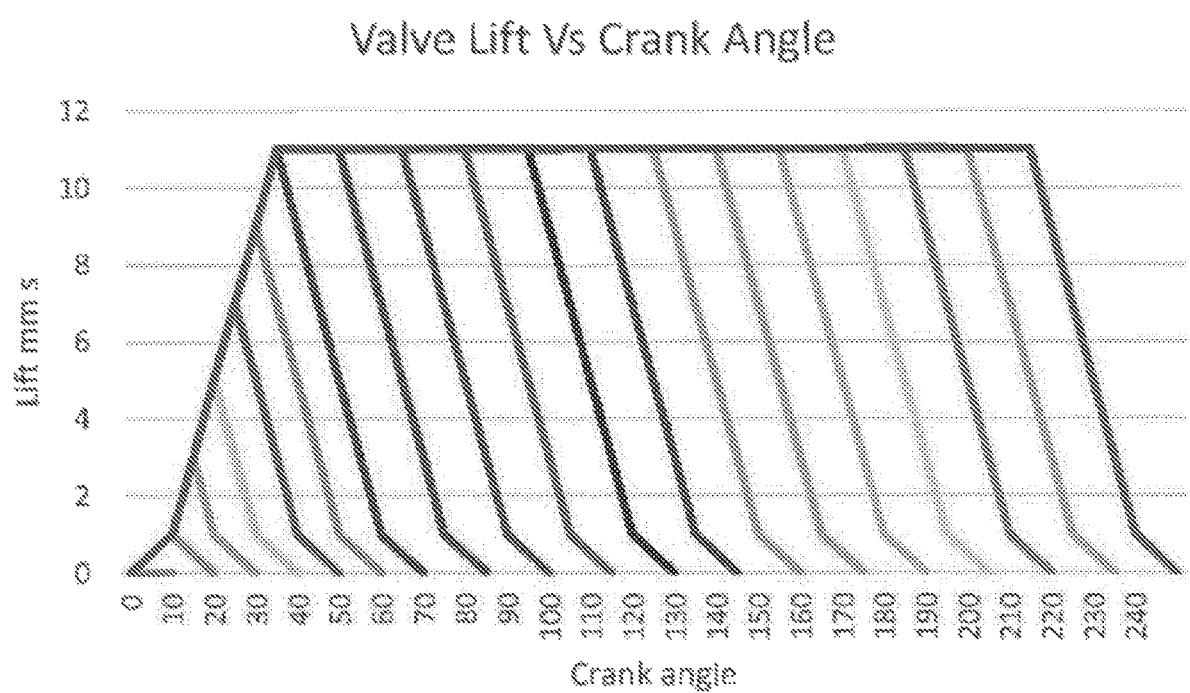
FIG. 8 graphically illustrates various intake valve control profiles enabled by the camless valve control system, in accordance with the present disclosure.

FIG. 8 graphically illustrates various intake valve control profiles enabled by the camless valve control system, in accordance with the present disclosure. The various plots show how the timing of the valve closing can be freely adjusted through adjustment of the associated return control ring.

Figure 9:
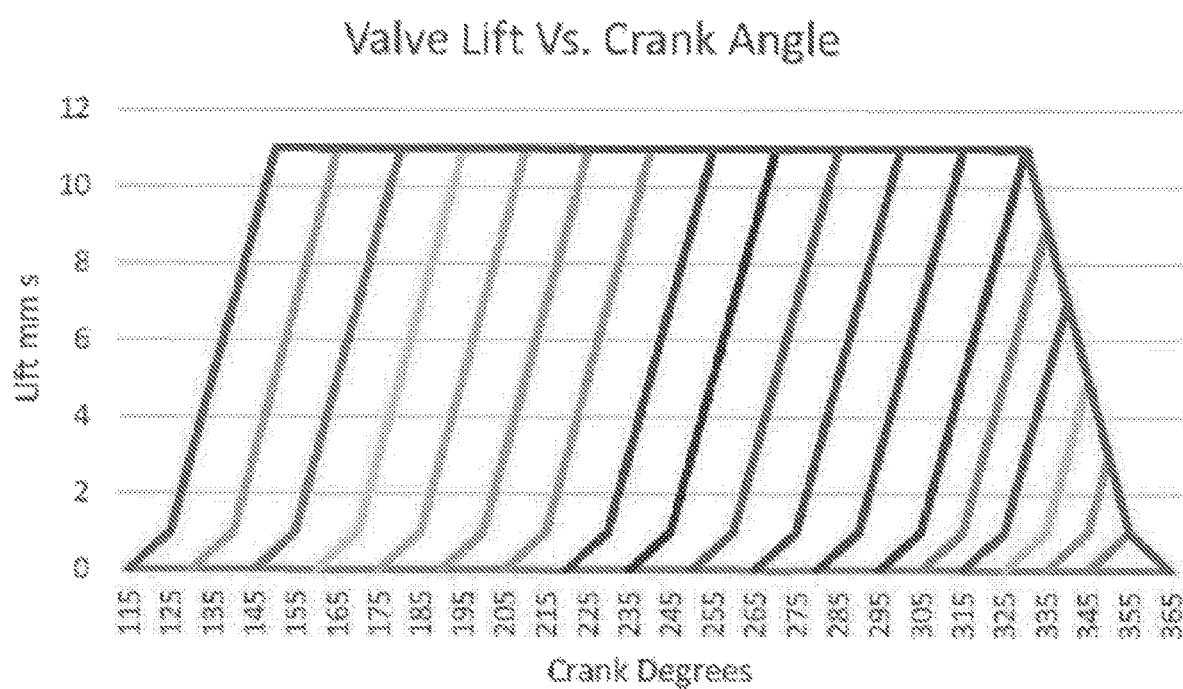
FIG. 9 graphically illustrates various exhaust valve control profiles enabled by the camless valve control system, in accordance with the present disclosure.

FIG. 9 graphically illustrates various exhaust valve control profiles enabled by the camless valve control system, in accordance with the present disclosure. The various plots show how the timing of the valve opening can be freely adjusted through adjustment of the associated supply control ring.

Figure 10:
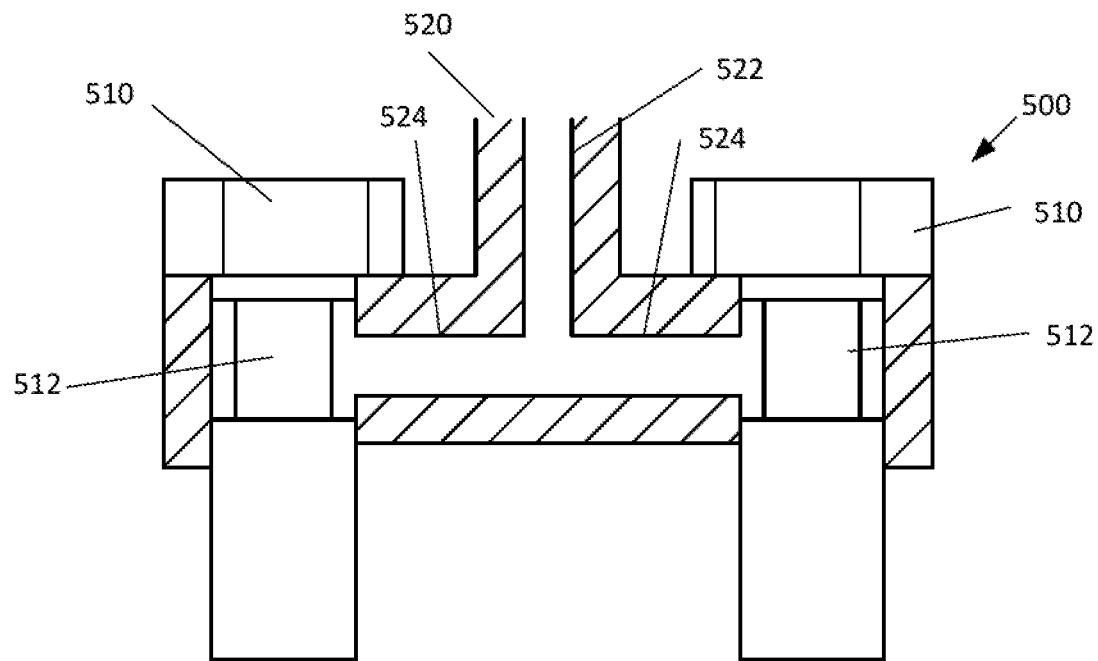
FIG. 10 illustrates exemplary connection of a T-connection to two banjo bolts, the illustrated configuration useful for connecting the pump of the disclosure to a hydraulic actuator, in accordance with the present disclosure.

FIG. 10 illustrates exemplary connection of a T-connection to two banjo bolts, the illustrated configuration useful for connecting the pump of the disclosure to a hydraulic actuator, in accordance with the present disclosure. Exemplary banjo bolts 510 are illustrated including hydraulic passages 512, mechanisms known in the art for connecting a hydraulic circuit and providing hydraulic fluid to and from a device. T-connection 520 is illustrated fluidly connecting a hydraulic circuit portion 522 and the banjo bolts 510. The central portion extending upward is a control circuit path to the engine valves. One of the banjo bolts provides pressurized fluid from the pump, and the other the banjo bolts releases the pressurized fluid back to the pump. The configuration of FIG. 10 is one exemplary, non-limiting way to use the disclosed pump configuration of FIG. 1A.

Figure 11:
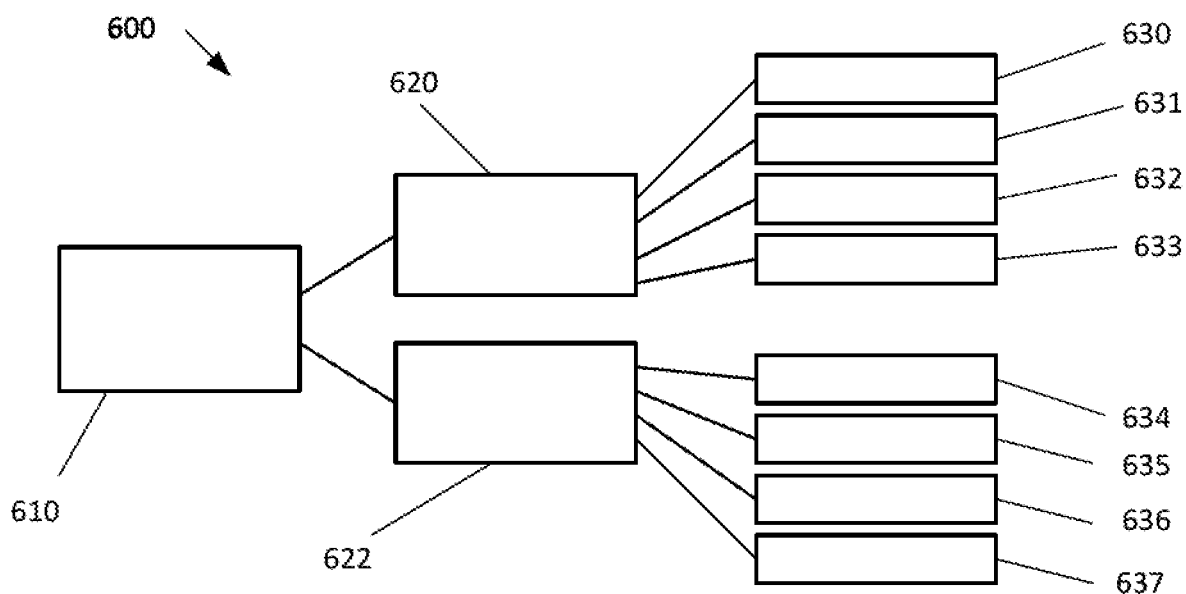
FIG. 11 illustrates schematically distribution of hydraulic control fluid from the hydraulic pump of FIG. 1, in accordance with the present disclosure.

FIG. 11 illustrates schematically distribution of hydraulic control fluid from the hydraulic pump of FIG. 1, in accordance with the present disclosure. System 600 is illustrated. Hydraulic pump portion 610 supplies and receives return oil from a first oil distribution system 620, including one or more pump bodies and associated control rings, and from a second oil distribution system 622, including one or more pump bodies and associated control rings. Four intake valves 630, 631, 632, and 633 are illustrated, one for each cylinder of an exemplary 4 cylinder engine, and four exhaust valves 634, 635, 636, and 637 are illustrated, also one for each cylinder.

Figure 12:
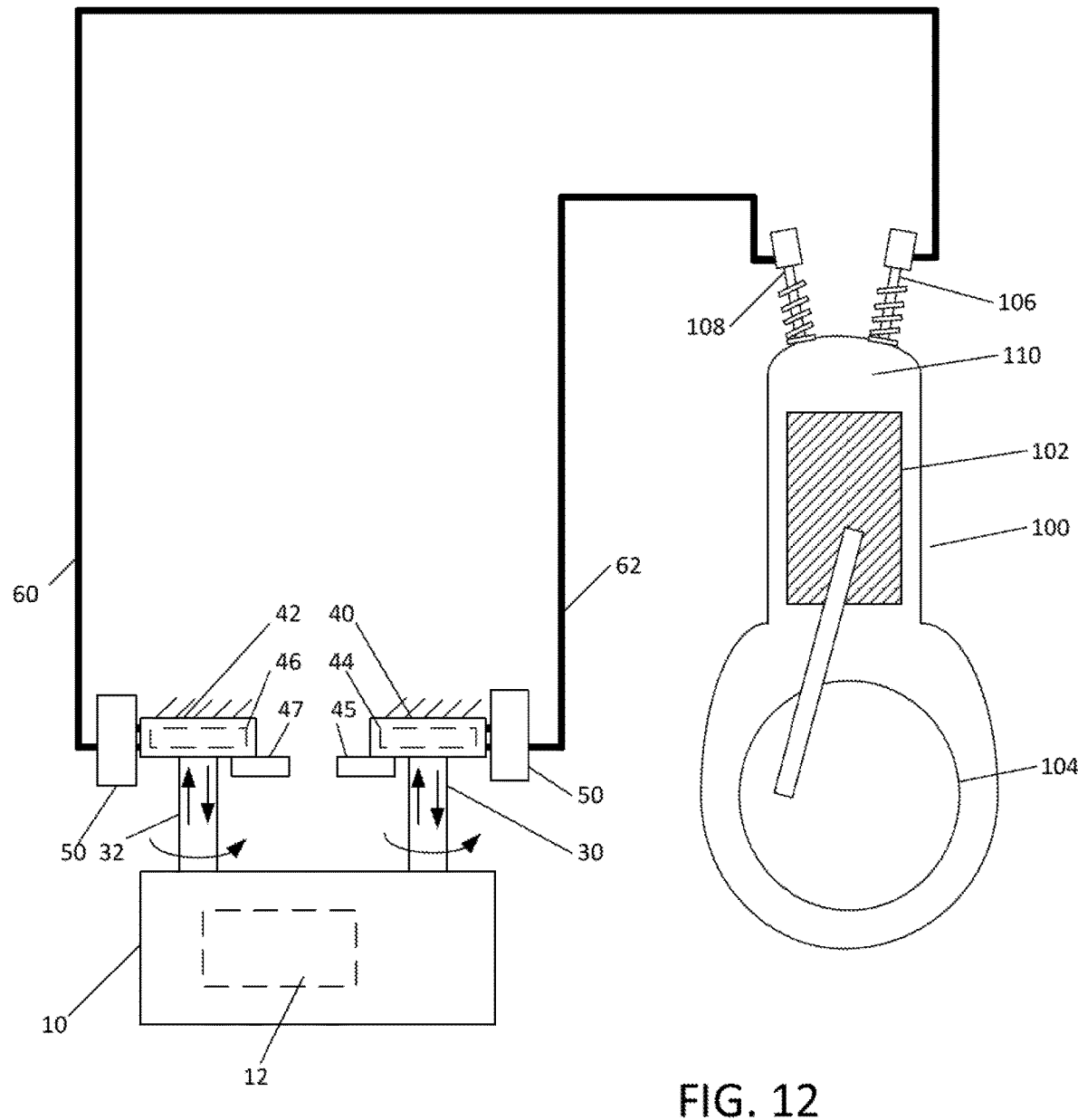
FIG. 12 illustrates an exemplary engine system controlled by a first exemplary camless valve control system, with rotation of a shaft of a hydraulic pump device controlling rotation of cylindrical pump bodies in relation to static control rings for each of the pump bodies, the relative rotation controlling hydraulic pressures within a control circuit to control engine cylinder valves, in accordance with the present disclosure.

FIG. 12 illustrates an exemplary engine system controlled by a first exemplary camless valve control system, with rotation of a shaft of a hydraulic pump device controlling rotation of cylindrical pump bodies in relation to static control rings for each of the pump bodies, the relative rotation controlling hydraulic pressures within a control circuit to control engine cylinder valves, in accordance with the present disclosure. Engine 100 is illustrated including a piston 102, a crankshaft 104, a hydraulically controlled intake valve 108, a hydraulically controlled exhaust valve 106, and a cylinder head space 110.

Pump system 10 is illustrated including hydraulic pump device 12 which receives mechanical power through a timing chain attached to engine 100 and supplies pressurized oil to the disclosed system. Pump device 12 also supplies mechanical torque to each of pump body 30 controlling intake valve 108 and pump body 32 controlling exhaust valve 106. Actuator housing 40 is illustrated containing one or more control rings 44 in fluid contact with pump body 30. Actuator housing 42 is illustrated containing one or more control rings 46 in fluid contact with pump body 32. Banjo bolt and T valve connections 50 are each illustrated attached to actuator housings 40 and 42. Electric servo motor 45 is illustrated attached to housing 40, permitting computerized control of each of the control rings 44 within housing 40. Electric servo motor 47 is illustrated attached to housing 42, permitting computerized control of each of the control rings 46 within housing 42. Hydraulic control circuit 60 fluidly connects the control system to exhaust valve 106, and hydraulic control circuit 62 fluidly connects the control system to exhaust valve 108.

Figure 13:
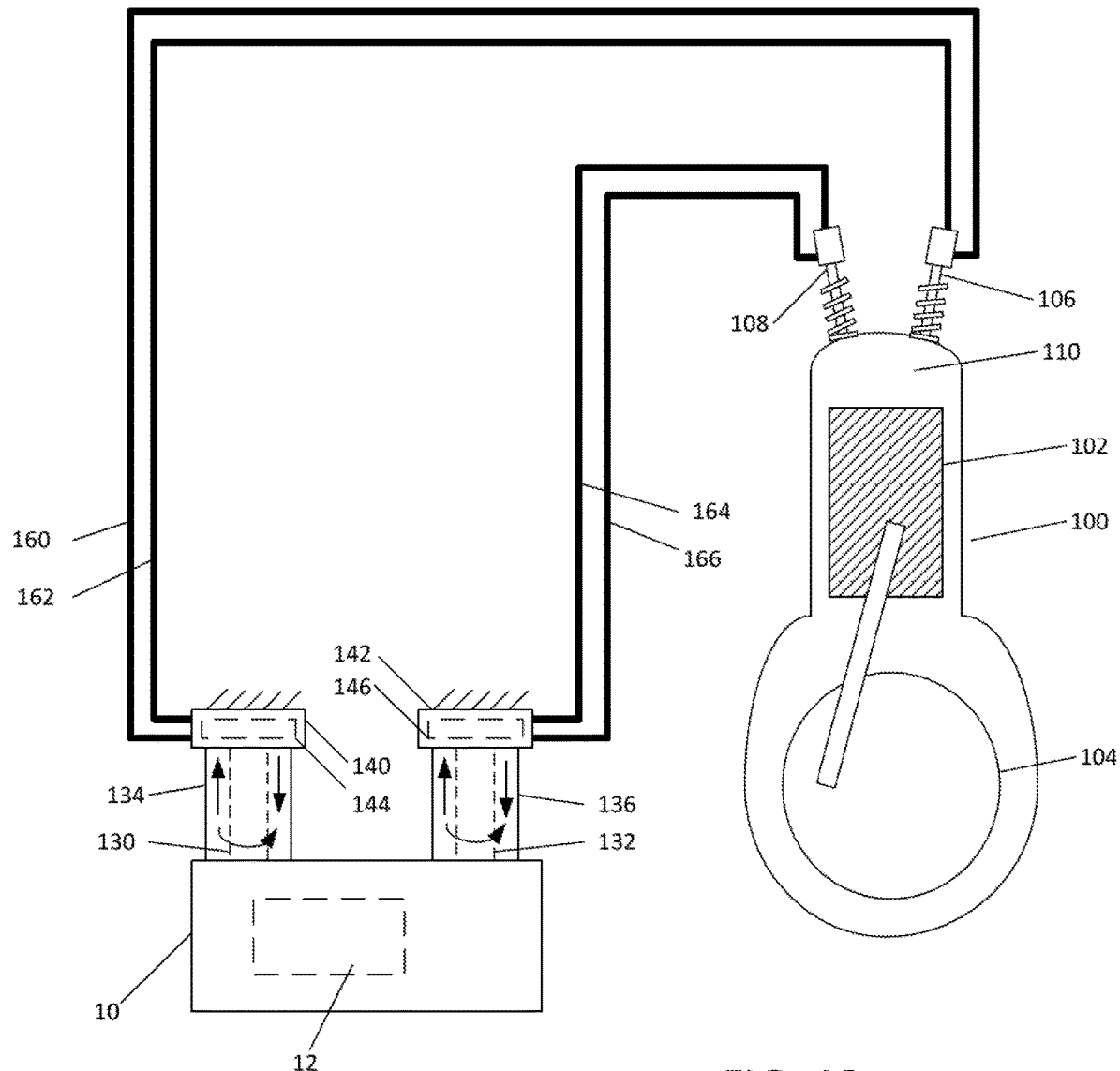
FIG. 13 illustrates an exemplary engine system controlled by an alternative exemplary camless valve control system, in accordance with the present disclosure.

FIG. 13 illustrates an exemplary engine system controlled by an alternative exemplary camless valve control system, in accordance with the present disclosure. Engine 100 is illustrated including a piston 102, a crankshaft 104, a hydraulically controlled intake valve 108, a hydraulically controlled exhaust valve 106, and a cylinder head space 110.

Pump system 10 is illustrated including hydraulic pump device 12 which receives mechanical power through a timing chain attached to engine 100 and supplies pressurized oil to the disclosed system. Pump device 12 also supplies mechanical torque to each of pump body 130 controlling exhaust valve 106 and pump body 132 controlling intake valve 108. Actuator housing upper portion 140 is illustrated containing one or more control rings 144 in fluid contact with pump body 130. Actuator housing lower portion 134 is illustrated containing pump body 130. Actuator housing 142 is illustrated containing one or more control rings 146 in fluid contact with pump body 132. Actuator housing lower portion 136 is illustrated containing pump body 132. Pump bodies 130 and 132 can include internal passages to conduct oil to and from the control rings. In addition, housing lower portions 134 and 136 can optionally be configured with passages to also or alternatively conduct oil. Instead of utilizing banjo bolt and T valve connections, the embodiment of FIG. 13 illustrates separate supply hydraulic lines 160 and 166 and separate return hydraulic lines 162 and 164. Control rings 144 and 146 are illustrated as optionally fixed control rings, with no mechanism for timing adjustments.

Figure 14:
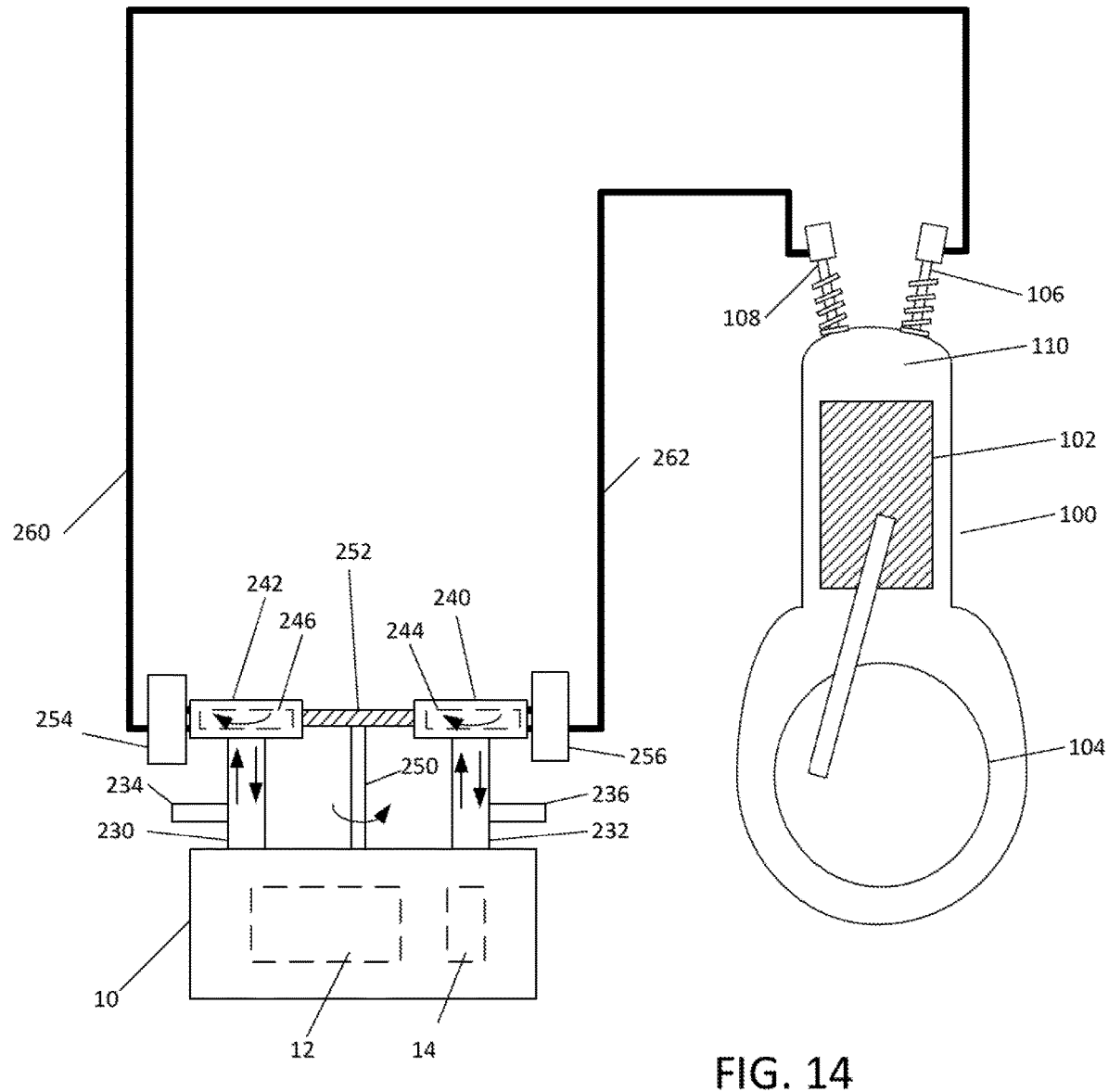
FIG. 14 illustrates an exemplary engine system controlled by an additional alternative exemplary camless valve control system, in accordance with the present disclosure.

FIG. 14 illustrates an exemplary engine system controlled by an additional alternative exemplary camless valve control system, in accordance with the present disclosure. Engine 100 is illustrated including a piston 102, a crankshaft 104, a hydraulically controlled intake valve 108, a hydraulically controlled exhaust valve 106, and a cylinder head space 110.

Pump system 10 is illustrated including hydraulic pump device 12 which receives mechanical power through a timing chain attached to engine 100 and supplies pressurized oil to the disclosed system. Pump system 10 further includes a computerized control module 14, including programming configured to control timing adjustments in accordance with the disclosure. In FIGS. 12 and 13, pump bodies are illustrated configured to constantly rotate in timing with the engine. In the embodiment of FIG. 14, an alternative configuration is illustrated where the control rings 246 and 244 are configured to constantly rotate and the pump bodies 230 and 232 are configured to remain essentially static, with only timing changes controlled by servo motors 234 and 236, respectively. Pump device 12 supplies mechanical torque to each of control rings 246 and 244. Actuator housing 240 is illustrated containing one or more control rings 244 in fluid contact with pump body 232. Actuator housing 242 is illustrated containing one or more control rings 246 in fluid contact with pump body 230. Banjo bolt and T valve connections 254 and 256 are each illustrated attached to actuator housings 242 and 240, respectively. Hydraulic control circuit 260 fluidly connects the control system to exhaust valve 108. Hydraulic control circuit 262 fluidly connects the control system to exhaust valve 108.

A number of alternative system configurations to the embodiments of FIGS. 12-14 are envisioned, and the disclosure is not intended to be limited to the particular examples provided herein.

Figure 15:
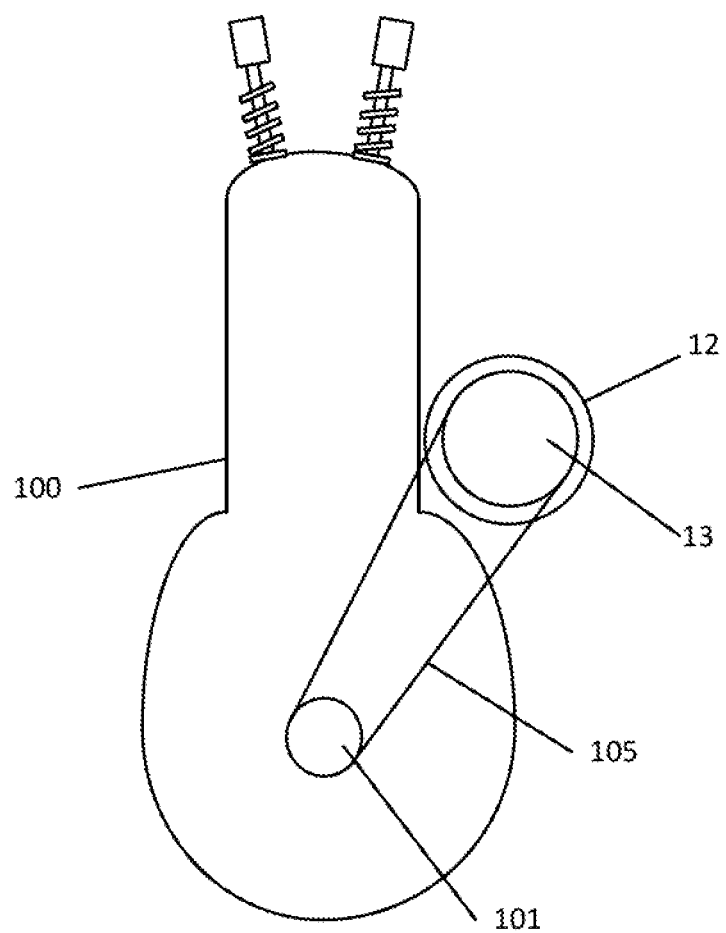
FIG. 15 illustrates an exemplary engine system connected to a hydraulic pump device of the disclosed system with a timing chain, in accordance with the present disclosure.

FIG. 15 illustrates an exemplary engine system connected to a hydraulic pump device of the disclosed system with a timing chain, in accordance with the present disclosure. Engine 100 is illustrated including an output shaft wheel 101. Hydraulic pump device 12 is illustrated including an input shaft wheel 13. In one embodiment, wheel 101 and wheel 13 are each sized to ensure that wheel 13 turns once for every two turns of wheel 101. Wheel 101 is connected to wheel 13 through timing chain 105 which engages to timing teeth on each of wheels 101 and wheel 13 to ensure that precise timing is maintained between the two wheels. Timing chain 105 is one way to mechanically drive pump device 12 accurately in time with engine 100. It will be appreciated that gears with intermeshed teeth can similarly be utilized to mechanically connect pump device 12 and engine 100.

Figure 16:
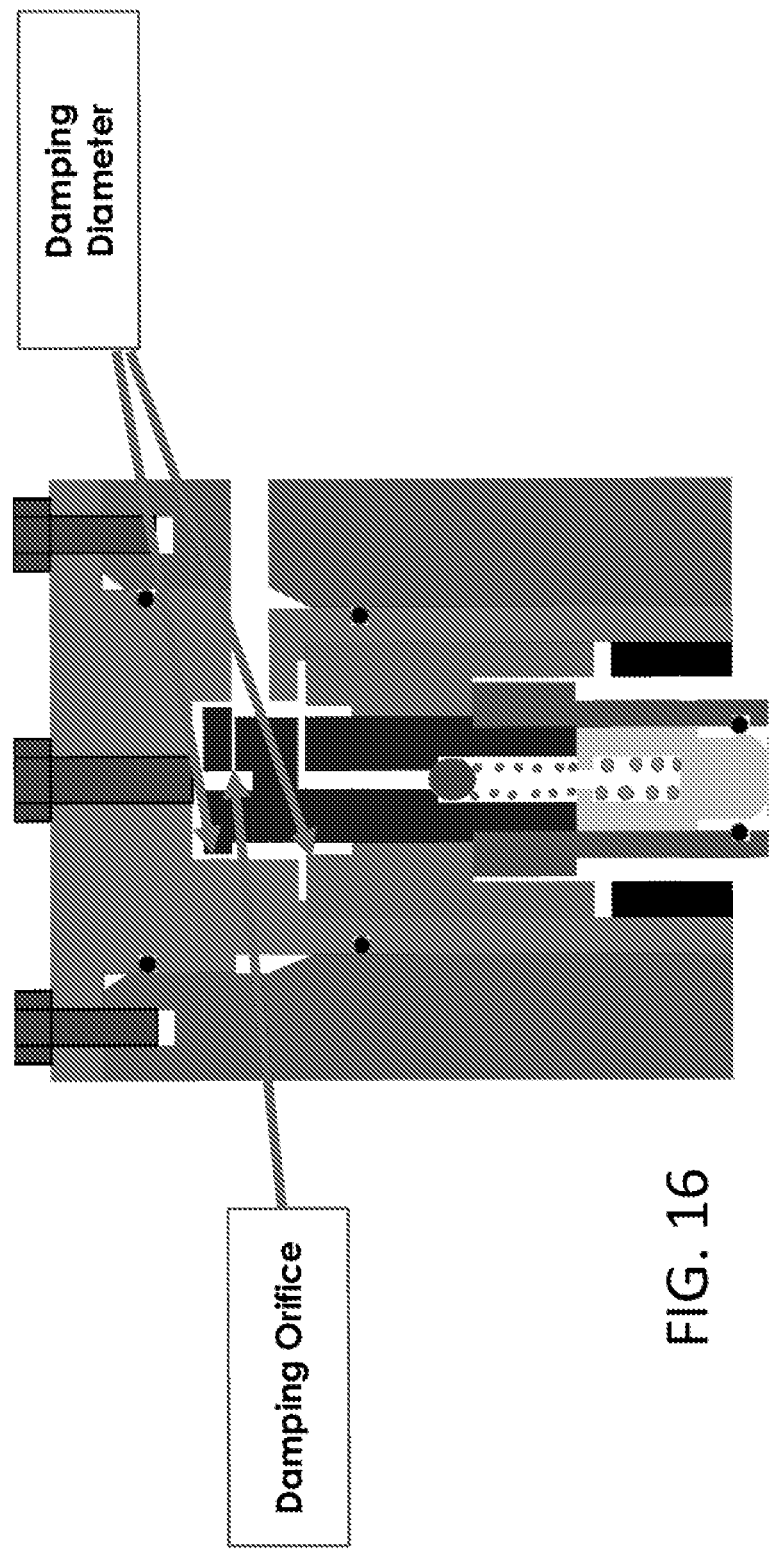
FIG. 16 illustrates an exemplary hydraulic actuator similar to the hydraulic actuator of FIG. 1, with an optional dampening orifice useful in controlling hydraulic control pressures, in accordance with the present disclosure.

FIG. 16 illustrates an exemplary hydraulic actuator similar to the hydraulic actuator of FIG. 1, with an optional dampening orifice useful in controlling hydraulic control pressures, in accordance with the present disclosure.

Figure 17:
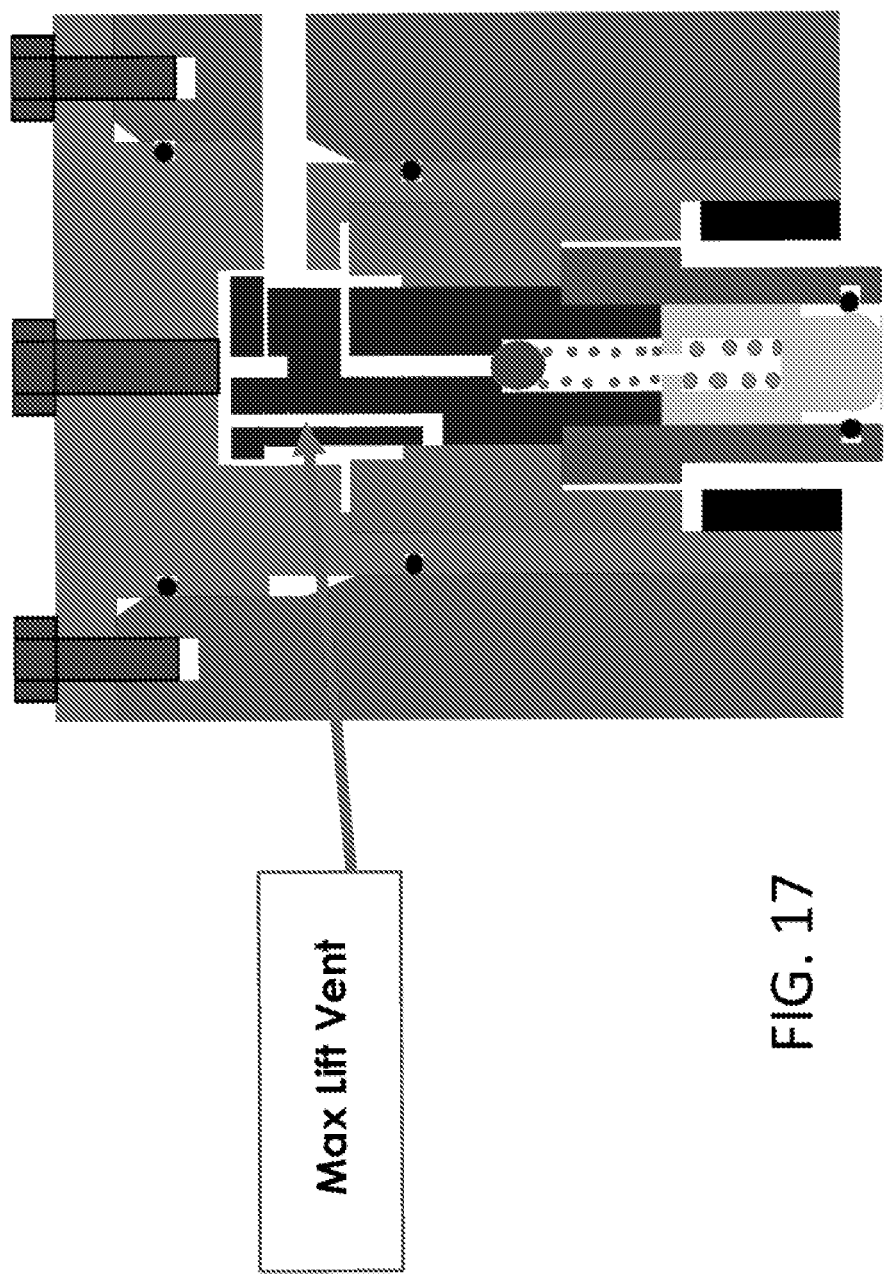
FIG. 17 illustrates the hydraulic actuator including a maximum lift vent, in accordance with the present disclosure.

FIG. 17 illustrates the hydraulic actuator including a maximum lift vent, in accordance with the present disclosure.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A camless valve control system for an internal combustion engine, comprising:
   a hydraulic pump, with a rotating shaft timed to the operation of the engine; and
   a hydraulic actuator configured to selectively open and close one of an intake valve and an exhaust valve of the engine, the hydraulic actuator comprising:
      a rotating cylindrical pump body comprising:
         a cylindrical center portion configured to receive torque from the hydraulic pump; and
         at least one channel providing a flow of hydraulic control fluid from the pump; and
      one or more control rings with holes channeling the flow of the hydraulic control fluid to affect the selective opening and closing of the one of the intake value and the exhaust valve.

2. The camless valve control system of claim 1, wherein the one or more control rings can be rotated to control timing of the selective opening and closing of the one of the intake value and the exhaust valve.

3. A camless valve control system for an internal combustion engine, comprising:
   a hydraulic pump, with a rotating shaft timed to the operation of the engine; and
   a first hydraulic actuator configured to control an intake valve for the engine, comprising:
      a first rotating cylindrical pump body comprising:
         a cylindrical center portion configured to receive torque from the hydraulic pump;
         a channel providing a flow of hydraulic control fluid from the pump; and
         a channel providing a return flow of hydraulic control fluid to the pump; and
      a first set of two control rings proximate to the first rotating cylindrical pump body;
   a second hydraulic actuator configured to control an exhaust valve for the engine, comprising:
      a second rotating cylindrical pump body comprising:
         a cylindrical center portion configured to receive torque from the hydraulic pump;
         a channel providing a flow of hydraulic control fluid from the pump; and
         a channel providing a return flow of hydraulic control fluid to the pump; and
      a second set of two control rings proximate to the second rotating cylindrical pump body.

4. The camless valve control system of claim 3, wherein each of the control rings can be rotated to control timing of the intake value and the exhaust valve.

* * * * *